US012765447B2

(12) United States Patent
Rydmark

(10) Patent No.: US 12,765,447 B2
(45) Date of Patent: Oct. 20, 2026

(54) AGRICULTURAL IMPLEMENT AND METHOD OF FEEDING GRANULAR MATERIAL TO GROUND OVER WHICH THE AGRICULTURAL IMPLEMENT TRAVELS

(71) Applicant: Väderstad Holding AB, Väderstad (SE)

(72) Inventor: Niclas Rydmark, Mjölby (SE)

(73) Assignee: Väderstad Holding AB, Väderstad (SE)

( * ) Notice: Subject to any disclaimer, the term of this patent is extended or adjusted under 35 U.S.C. 154(b) by 454 days.

(21) Appl. No.: 18/278,087

(22) PCT Filed: Feb. 21, 2022

(86) PCT No.: PCT/SE2022/050185
§ 371 (c)(1),
(2) Date: Aug. 21, 2023

(87) PCT Pub. No.: WO2022/182278
PCT Pub. Date: Sep. 1, 2022

(65) Prior Publication Data
US 2024/0122095 A1 Apr. 18, 2024

(30) Foreign Application Priority Data
Feb. 23, 2021 (SE) .................................... 2150190-3

(51) Int. Cl.
*A01C 7/16* (2006.01)
*A01C 7/10* (2006.01)
(Continued)

(52) U.S. Cl.
CPC ................ *A01C 7/16* (2013.01); *A01C 7/105* (2013.01); *A01C 15/007* (2013.01); *A01C 19/02* (2013.01)

(58) Field of Classification Search
CPC ........... A01C 7/16; A01C 7/105; A01C 7/201; A01C 15/005; A01C 15/007; A01C 19/02;
(Continued)

(56) References Cited

U.S. PATENT DOCUMENTS 2,529,180 A 11/1950 Oehler
2,612,980 A 10/1952 Oehler
(Continued)

FOREIGN PATENT DOCUMENTS

AR 010715 A4 7/2000
CH 530151 A 11/1972
(Continued)

*Primary Examiner* — Alicia Torres
(74) *Attorney, Agent, or Firm* — COATS & BENNETT, PLLC

(57) ABSTRACT

A device (16) for feeding granular material in an agricultural implement comprises an auger conveyor (163*a*, 163*b*), which is designed to feed the material, an agitator (162), and a drive device (167, 168*a*, 168*b*) for driving the agitator (162) and the auger conveyor (163*a*, 163*b*). The drive device (167, 168*a*, 168*b*) is adjustable between a first operating state, in which the agitator (162) is driven, but not the auger conveyor (163*a*, 163*b*), and a second operating state, in which both the agitator (162) and the auger conveyor (163*a*, 163*b*) are driven.

14 Claims, 4 Drawing Sheets

(51) Int. Cl.
*A01C 15/00* (2006.01)
*A01C 19/02* (2006.01)

(58) Field of Classification Search
CPC ........ B65G 65/22; B65G 33/04; B65G 33/14; B65G 33/34
USPC ................. 198/657, 658, 670, 671, 674, 311
See application file for complete search history.

(56) References Cited

U.S. PATENT DOCUMENTS

| | | | | |
|---|---|---|---|---|
| 3,159,406 | A | 12/1964 | Morr et al. | |
| 3,194,639 | A | 7/1965 | Brown et al. | |
| 3,794,046 | A | 2/1974 | Muijs | |
| 4,539,801 | A | 9/1985 | Field | |
| 4,884,724 | A | 12/1989 | Schmidt | |
| 5,466,188 | A | 11/1995 | Schaal et al. | |
| 5,752,374 | A | 5/1998 | Allwörden et al. | |
| 6,193,053 | B1 * | 2/2001 | Gaalswyk | B65G 33/18 198/662 |
| 9,950,872 | B2 * | 4/2018 | Rauser | B65G 33/32 |
| 2005/0242222 | A1 | 11/2005 | Torres Aso | |
| 2012/0168539 | A1 * | 7/2012 | Kim | A01C 15/007 239/682 |
| 2019/0313581 | A1 | 10/2019 | Sorensen | |
| 2020/0245535 | A1 * | 8/2020 | Schilling | B01F 33/805 |

FOREIGN PATENT DOCUMENTS

| | | | |
|---|---|---|---|
| CN | 108355518 | A | 8/2018 |
| CN | 111406488 | A | 7/2020 |
| CN | 111804223 | A | 10/2020 |
| CN | 211997478 | U | 11/2020 |
| CN | 212024136 | U | 11/2020 |
| CN | 112005643 | A | 12/2020 |
| DE | 1409846 | A1 | 1/1969 |
| EP | 0313995 | A1 | 5/1989 |
| EP | 0403780 | A1 | 12/1990 |
| FR | 2356352 | A1 | 1/1978 |
| FR | 2525425 | A1 | 10/1983 |
| GB | 919870 | A | 2/1963 |
| GB | 1012266 | A | 12/1965 |
| GB | 1264680 | A | 2/1972 |
| RU | 190465 | U1 | 7/2019 |
| WO | 2013178892 | A1 | 12/2013 |

* cited by examiner

AGRICULTURAL IMPLEMENT AND METHOD OF FEEDING GRANULAR MATERIAL TO GROUND OVER WHICH THE AGRICULTURAL IMPLEMENT TRAVELS

TECHNICAL FIELD

This document relates to an agricultural implement for feeding granular material to ground over which the agricultural implement travels, such as a seed drill, a fertilizer spreader or a pesticide spreader. The document relates in particular to an agricultural implement which has an improved device for feeding the material from a material container.

The document also relates to a method of feeding granular material to ground over which an agricultural implement travels.

BACKGROUND

Agricultural implements for distributing granular material to ground over which the agricultural implements travel are known which have a material container with an elongate bottom, provided with an auger conveyor extending along the bottom and feeding the seeds towards an outlet from the container, and, at the outlet, an agitator which is designed to prevent the material from building a bridge across the outlet and thus impeding the material from reaching the outlet.

Such an agricultural implement is disclosed in GB1264680, in which the auger conveyor and the agitator are arranged on a common shaft.

In some agricultural implements, the material is fed, with the aid of a feeder wheel, from the outlet of the container to a pneumatic conveying device for onward transport towards sowing units or row units.

A problem with such agricultural implements is that, if the feed rate of the auger conveyor becomes too high in relation to the feed rate of the feeder wheel, the material can be pressed together at the outlet of the container, which can result in damage to the material and/or to the agricultural implement.

There is therefore a need for an agricultural implement that is improved in this respect.

SUMMARY

It is an object of the invention to make available an improved agricultural implement for distributing granular material to ground over which the agricultural implement travels, in particular an agricultural implement in which there is less risk of the material being pressed together at the outlet of the container.

The invention is defined by the accompanying independent claims. Embodiments are set forth in the accompanying dependent claims, in the description that follows and in accompanying drawings.

According to a first aspect, a device for feeding granular material in an agricultural implement is provided. The device comprises an auger conveyor, which is designed to feed the material, an agitator, and a drive device for driving the agitator and the auger conveyor. The drive device is adjustable between a first operating state, in which the agitator is driven, but not the auger conveyor, and a second operating state, in which both the agitator and the auger conveyor are driven.

A "drive device" is understood as a device which is configured to drive the agitator and the auger conveyor. Such a drive device can comprise an actuator, especially a motor, such as a hydraulic motor or electric motor.

By driving only the agitator, it is possible to avoid material being pressed together by the auger conveyor. By driving both the auger conveyor and the agitator, it is possible to obtain simultaneous feeding of material and agitation of material.

The device can be provided as a module, which can be retrofitted in order to replace an existing auger conveyor or agitator in an agricultural implement. Alternatively, the device can be provided as an integrated part in a material container of an agricultural implement.

The auger conveyor and the agitator are rotatable about a common geometric axis.

By arranging both agitator and auger conveyor on a common geometric axis, it is possible to obtain a very compact device. Moreover, it is possible to replace existing feeder or agitator devices.

The agitator can be connected to a first drivable shaft, and the auger conveyor can comprise a screw blade which is arranged around a sleeve surrounding the shaft.

The drive device comprises an actuator, which is configured to drive the agitator, and a coupling device, which is configured to cause the auger conveyor to be driven together with the agitator.

The coupling device is configured, in a first direction of rotation of the actuator, only to drive the agitator, such that the first operating state is obtained, and, in a second, opposite direction of rotation of the actuator, to drive both the agitator and the auger conveyor, such that the second operating state is obtained. The coupling device can be formed, for example, by a so-called freehub.

The auger conveyor can comprise a first screw blade portion, which is located on a first axial side of the agitator, and a second screw blade portion, which is located on a second axial side of the agitator, wherein said first and second screw blade portions are threaded in opposite directions such that, when they rotate with a first direction of rotation, they feed the material axially towards the agitator.

Alternatively, separate coupling devices can be arranged for said first and second screw blade portions.

The device can further comprise an upwardly concave bottom along which the granular material is transportable with the aid of the auger conveyor, and an outlet in said bottom, wherein the agitator is located at the outlet.

The device can comprise a trough, which forms said bottom.

According to a second aspect, an agricultural implement for feeding granular material to ground over which the agricultural implement travels is provided, which agricultural implement has a container for the granular material, and a device according to what has been described above, which is located at a lower portion of the container.

The agricultural implement can comprise a material sensor and a control unit connected to the material sensor, wherein the control unit is designed to control the drive device based on a signal from the material sensor.

According to a third aspect, a method of feeding granular material to ground over which an agricultural implement travels is provided, wherein the agricultural implement comprises an agitator and an auger conveyor, and wherein the method comprises adjusting the agricultural implement between a first operating state, in which the agitator is driven, but not the auger conveyor, and a second operating state, in which both the agitator and the auger conveyor are driven.

The agricultural implement can comprise a container for the granular material, an outlet, arranged at a lower portion of the container, for the granular material, wherein the auger conveyor is arranged along the lower portion and is designed to feed material towards the outlet, wherein the agitator is located at the outlet, and a drive device which is arranged to drive the agitator and the auger conveyor.

The adjustment is performed by changing a direction of rotation of the drive device, wherein the auger conveyor is activated with the aid of a freehub.

The method can further comprise receiving a signal from a material sensor, and performing said adjustment based on a signal from the material sensor.

The method can further comprise obtaining a higher speed of rotation in the second operating state than in the first operating state.

DETAILED DESCRIPTION

Figure 1A:
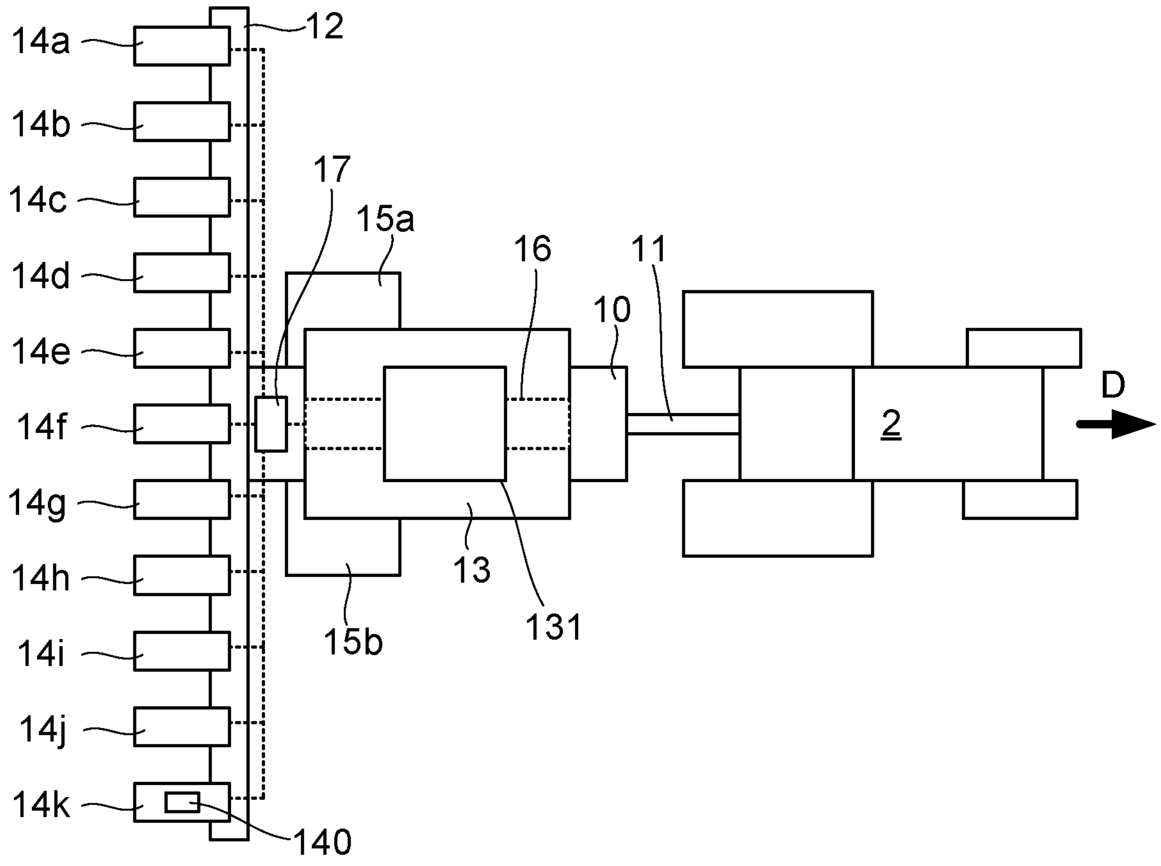
FIGS. 1*a*-1*b* show schematically, viewed from above and from the side, respectively, an agricultural implement 1, which is coupled to a towing vehicle 2, such as a tractor, and is arranged in a direction of forward travel D. In the example shown, the agricultural implement is in the form of a seed drill with a central container.
Figure 1B:
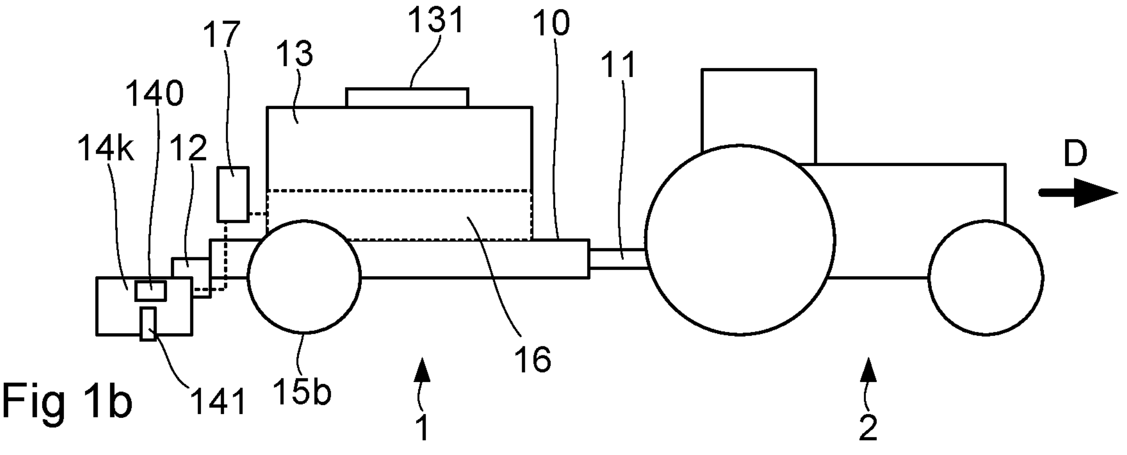

FIGS. 1*a*-1*b* show schematically, viewed from above and from the side, respectively, an agricultural implement 1, which is coupled to a towing vehicle 2, such as a tractor, and arranged in a direction of travel D. In the example shown, the agricultural implement is in the form of a seed drill with a central container.

It will be appreciated that a seed drill can have two or more such containers.

It will further be appreciated that the seed drill can be of any given type, such as a volumetrically feeding seed drill or a precision seed drill, which can have, but does not need to have, a central container which feeds seed to a plurality of row units.

The seed drill can feed seed directly from a container to the respective furrow opener. Alternatively, the seed drill can feed seed to a plurality of furrow openers or row units via a distributor, which can distribute an airflow mixed with material to a plurality of furrow openers or row units.

In the example shown, the agricultural implement has a main frame 10, a towing device 11, a cross frame 12, a container 13, which is supported by the main frame 10, and the container has an opening 131. The agricultural implement can comprise a plurality of row units 14*a*-14*k*, which are supported by the cross frame 12 and at least one wheel 15*a*, 15*b* and/or one or more rolling ground supports of another type, such as rollers or roller wheels.

The opening 131 can be provided with a closure, such as a lid or a tarpaulin.

Each of the row units 14*a*-14*k* can be provided with a singulator 140 for singulating seeds, and a dispensing device 141 which, as a non-limiting example, can have the form of a furrow opener or an arrangement comprising one or more of a seed furrow opener, a press wheel, a depth-regulating wheel and a seed furrow sealer.

Figure 2:
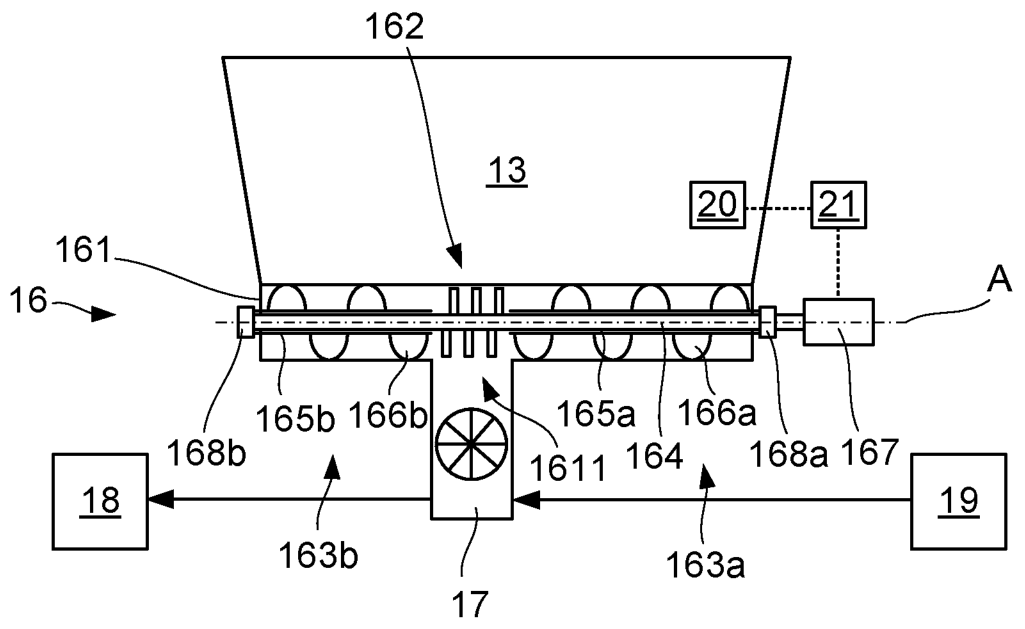
FIG. 2 shows schematically a first embodiment of the conveyor device 16 of the agricultural implement 1.

With reference to FIGS. 2-3, a conveyor device 16 can be arranged at a lower portion of the container 13 and is designed to feed material from the lower portion of the container 13 to a feeder device 17 which can be connected to a fan 19 and can be designed to inject the material into an air stream from the fan 19, such that an airflow mixed with material is conveyed onwards to the distributor 18 and from there to the dispensing devices 141.

FIG. 2 shows a first basic configuration of the conveyor device 16, which can comprise a trough 161. The latter can be open to the top and have a bottom with an upwardly concave shape, which can be substantially semi-cylindrical. The conveyor device 16 moreover has an outlet 1611 from the trough 161, to which the feeder device 17 is joined.

The conveyor device 16 moreover comprises an agitator 162, which is arranged attached to the outlet 1611. The agitator 162 can comprise a plurality of agitator projections, which extend substantially radially outwards from a rotatable shaft 164 and are configured to cause little or no displacement of the material along the shaft 164.

The conveyor device 16 comprises one or more auger conveyors 163*a*, 163*b*, which are configured to feed the material along the shaft 164 towards the outlet 1611.

The auger conveyors can comprise a first auger conveyor 163*a*, arranged on a first axial side of the outlet 1611, and a second auger conveyor 163*b*, arranged on a second axial side of the outlet 1611.

A "drive device" 167 is understood as a device which is configured to drive the agitator 162 and the auger conveyor 163*a*, 163*b*. Such a drive device 167 can comprise an actuator, especially a motor, such as a hydraulic motor or electric motor.

A motor 167 can be arranged to drive the shaft 164 and thus the agitator 162. The motor 167 can be any type of motor, for example a combustion motor, a hydraulic motor or an electric motor.

The auger conveyors 163*a*, 163*b* can be configured as respective screw blade portions 166*a*, 166*b*, which spiral along a respective sleeve 165*a*, 165*b* in a manner known per se. The sleeves 165*a*, 165*b* are arranged to surround the shaft 164, such that the shaft and the sleeves are rotatable about a common geometric axis A.

Bearings (not shown) can be arranged between the respective shaft and the respective sleeve.

In the embodiment shown in FIG. 2, the two sleeves 165*a*, 165*b* are arranged on a common shaft 164, which is drivable by the motor 167.

Coupling devices 168*a*, 168*b* are arranged between the shaft 164 and the respective sleeve 165*a*, 165*b* such that, when the coupling device 168*a*, 168*b* is in a first operating state, only the shaft 164 is driven to rotate by the motor 167, and the sleeves are not driven. When the coupling device 168*a*, 168*b* is in a second operating state, the sleeves 165*a*, 165*b* rotate, and therefore the auger conveyors 163*a*, 163*b* rotate together with the shaft 164.

It is possible to configure the coupling devices 168*a*, 168*b* as controllable shaft-hub couplings, which can be controlled, individually or jointly, by a control unit (not shown).

The coupling devices 168*a*, 168*b* can be configured preferably as a so-called freehub, i.e. as a bearing which, in a first direction of rotation, allows the shaft 164 to rotate freely relative to the sleeve 165*a*, 165*b*, and, in a second, opposite direction of rotation, causes the sleeve 165*a*, 165*b* to rotate with the shaft 164.

In embodiments in which two or more auger conveyors 163*a*, 163*b* are located on different axial sides of the outlet 1611, the auger conveyors can be configured with different thread directions, such that the auger conveyors 163*a*, 163*b*, despite rotating in the same direction, drive the material in opposite directions towards the outlet 1611.

A variant of the embodiment shown in FIG. 2 will now be described in more detail with reference to FIGS. 3*a*-3*d*.

Figure 3A:
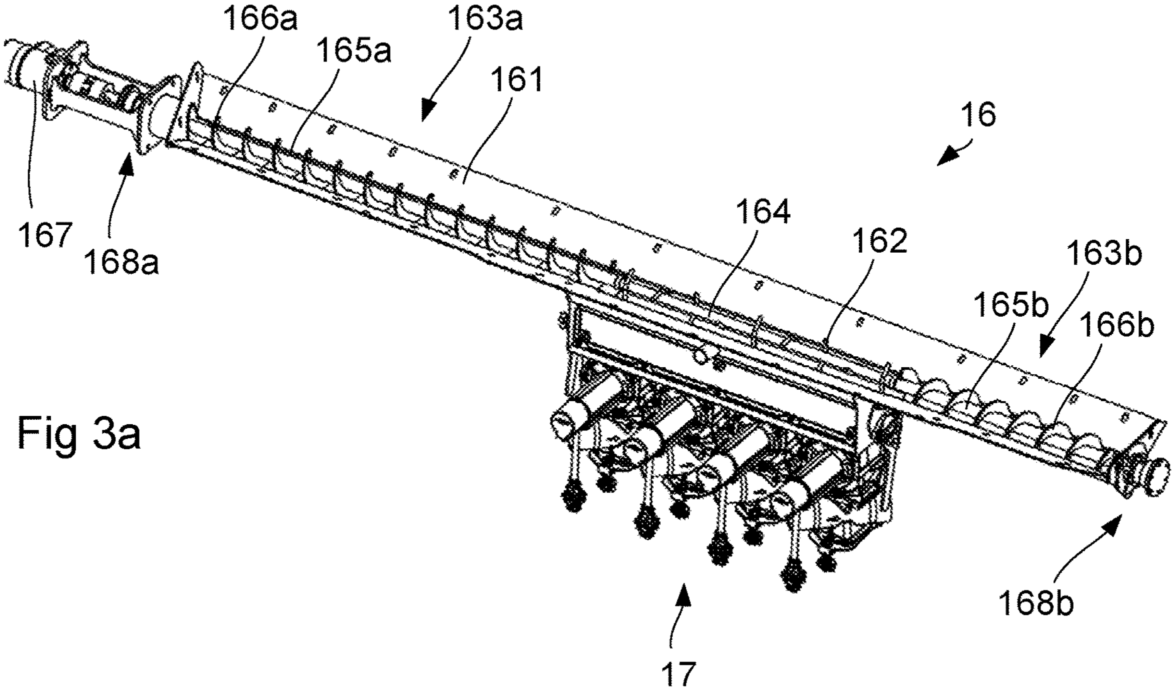
FIGS. 3*a*-3*d* show schematically a variant of the first embodiment of the conveyor device 16.
Figure 3B:
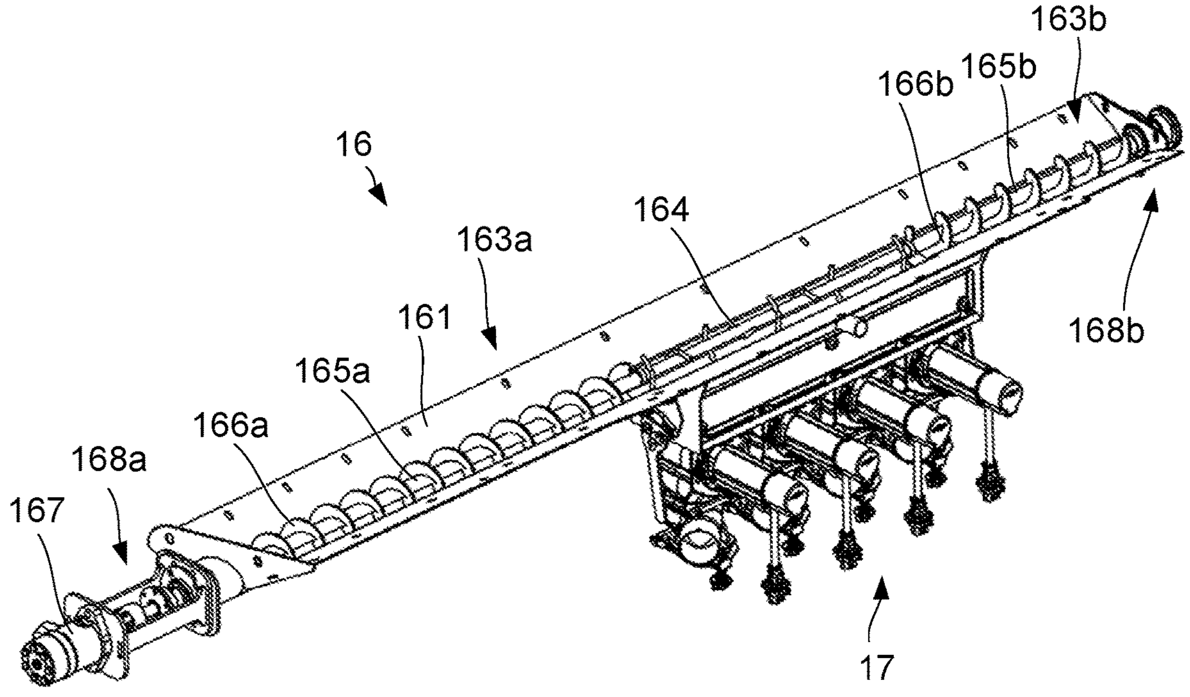

FIG. 3*a* shows the conveyor device 16 in a perspective view obliquely from above. The feeder device 17 shown in FIGS. 3*a*-3*b* here has four individually drivable feeder units. The number of feeder units can vary depending on what is considered suitable. For example, the number of feeder units can be 1, 2, 3, 4, 5-8 or 9-12.

The trough 161 is here configured as an elongate part with a substantially V-shaped or U-shaped cross section, of which the bottom portion is partially cylindrical, such that it conforms to the shape of the auger conveyor 163*a*, 163*b*.

A motor 167 and a first coupling device 168*a* are arranged at one end of the conveyor device, and a second coupling device 168*b* is arranged at its second, opposite end.

A first auger conveyor 163*a* is formed by a first sleeve 165*a*, around which a first screw blade portion 166*a* extends along a first helical trajectory.

A second auger conveyor 163*b* is formed by a second sleeve 165*b*, around which a second screw blade portion 166*b* extends along a second helical trajectory.

The first and second helical trajectories extend in different directions, i.e. one is threaded in a first direction and the other is threaded in a second, opposite direction, and therefore, when the auger conveyors 163*a*, 163*b* rotate with one and the same direction of rotation, they transport material in opposite axial directions, here inwards towards the outlet.

A common shaft 164 extends from the motor 167 at one end of the conveyor device 16 to the second coupling device 168*b* at the other end of the conveyor device 16.

The agitator 162 is located at the outlet to the feeder device 17.

The sleeves 165*a*, 165*b* surround the shaft 164 along the axial extent of the respective auger conveyor 163*a*, 163*b*. At the outlet, the shaft is radially exposed over an axial length that corresponds to the length of the outlet in the axial direction.

At the outlet, a plurality of agitator projections extend outward from the shaft to form the agitator 162.

Figure 3C:
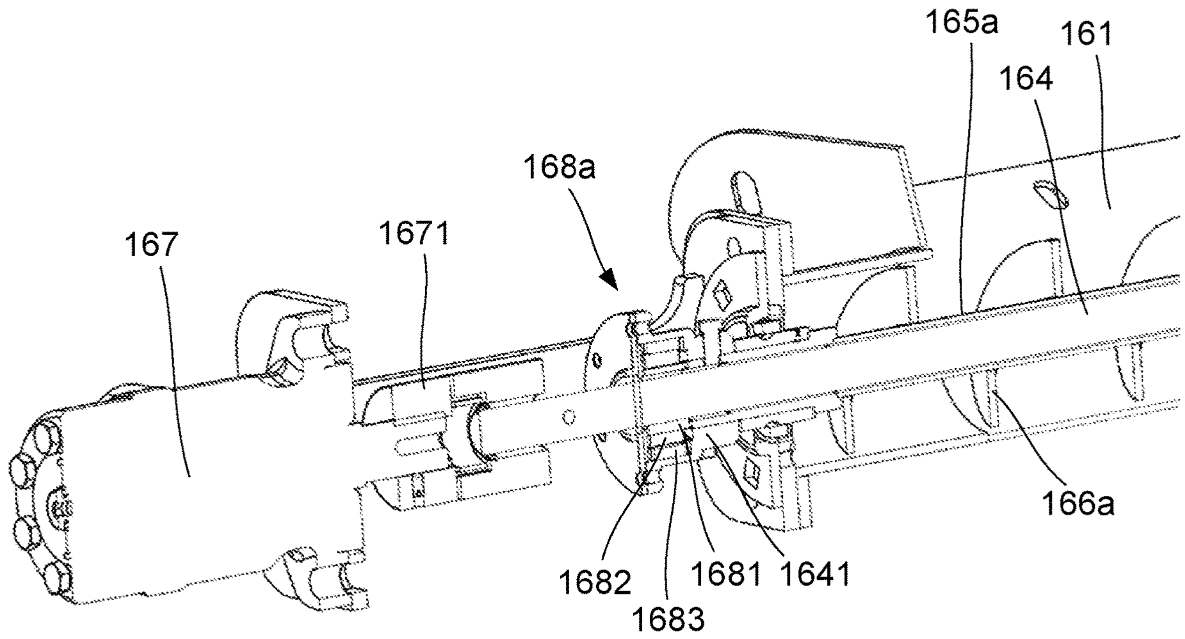

FIG. 3*c* shows a sectional perspective view of the first end of the conveyor device. As is shown in FIG. 3*c*, the motor 167 can be connected to the shaft 164 via a motor coupling 1671. The first coupling device 168*a* is here formed as a freehub with an inner ring 1681, a number of roller bodies 1682 and an outer ring 1683. The inner ring 1681 is arranged on the shaft 164, for example with the aid of a clamp fitting. The outer ring 1683 is attached to the first sleeve 165*a* via a first mounting sleeve 1641, which in turn is connected to 165*a*.

Figure 3D:
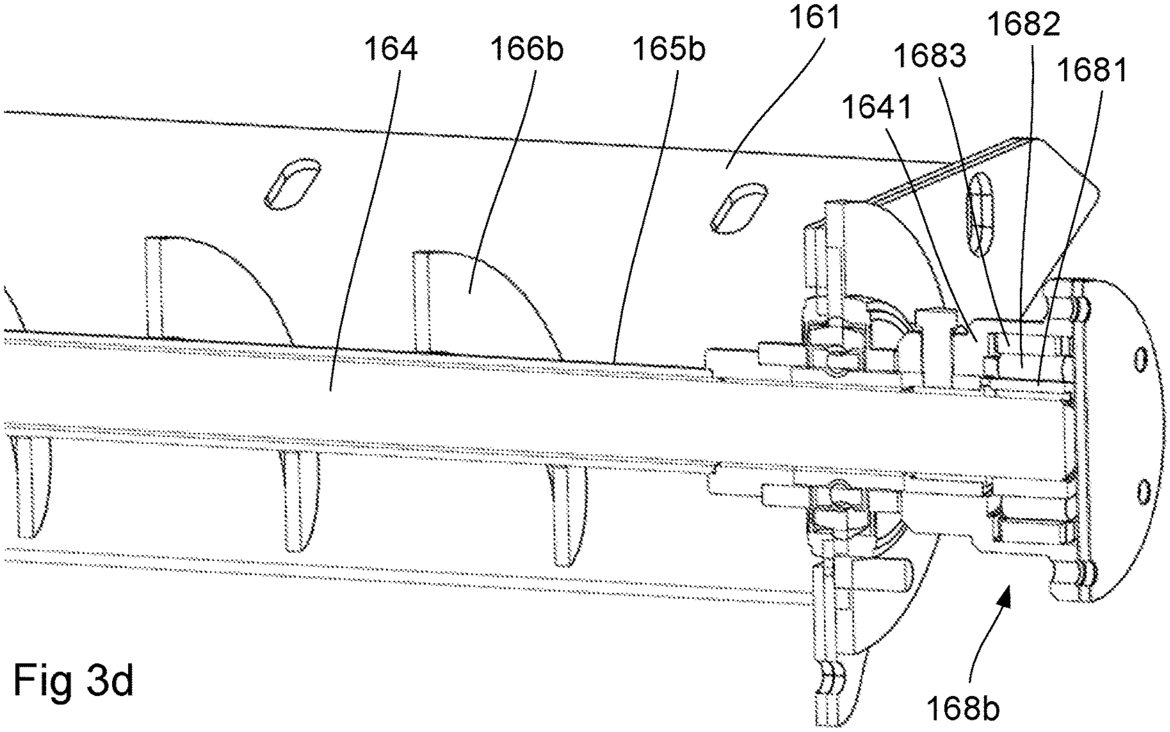

FIG. 3*d* shows a sectional perspective view of the other end of the conveyor device. The second coupling device 168*b* is here formed as a freehub with an inner ring 1681, a number of roller bodies 1682 and an outer ring 1683. The inner ring 1681 is arranged on the shaft 164, for example with the aid of a clamp fitting. The outer ring 1683 is attached to the second sleeve 165*b* via a first mounting sleeve 1641, which in turn is connected to 165*b*.

According to different alternative embodiments, the coupling can be configured as any type of mechanical coupling, such as a magnetic coupling, i.e. a coupling that can be actuated electrically.

The auger conveyor can be arranged directly in a bottom portion of a material container of an agricultural implement. Alternatively, the auger conveyor can be arranged in a trough, which is in turn arranged in or under the material container of the agricultural implement.

The device can be drivable in a first operating state, in which the agitator is driven, but not the auger conveyor. This state can be used as long as there is sufficient material in the container to ensure that there will be no absence of material at the outlet. By only driving the agitator, it is possible to ensure that no material bridges occur, while at the same time reducing the risk of material being pressed together, and thus possibly destroyed, by the auger conveyor.

The device can comprise a material sensor 20 and a control unit 21, which can be connected to the material sensor 20, in order to receive a signal corresponding to the amount of material in the container and/or the flow of material at the outlet 1611. The control unit 21 can moreover be arranged to control the drive device 167. The control unit 21 can be integrated with a central control unit, arranged in the agricultural implement, for the whole agricultural implement, or with a central control unit for the entire equipment, which can be arranged in a towing vehicle coupled to the agricultural implement.

When the material sensor 20 detects that the level in the container is dropping below a certain predetermined level, or when it detects that the amount of material being fed is dropping, the second operating state can be activated.

In the second operating state, both the agitator 162 and the auger conveyor 163*a*, 163*b* are driven. If appropriate, the speed of rotation of the drive device 167 can be increased.

It is also possible to control the speed of rotation of the drive device 167 as a function of the desired feed rate, such that a correct amount of material is fed towards the outlet.

Alternatively, the adjustment between said first operating state and second operating state can be performed by operator input.

The invention claimed is:

1. An agricultural implement, comprising:

an auger conveyor which is designed to feed granular material, an agitator, and a drive device for driving the agitator and the auger conveyor, wherein the auger conveyor and the agitator of the agricultural implement are rotatable about a common geometric axis, an upwardly concave bottom along which the granular material is transportable with the aid of the auger conveyor, and an outlet in said bottom, wherein the agitator is located at the outlet; the drive device is adjustable between:

a first operating state, in which the agitator is driven, but not the auger conveyor, and a second operating state, in which both the agitator and the auger conveyor are driven, wherein the drive device comprises an actuator, which is configured to drive the agitator, and a coupling device, which is configured to cause the auger conveyor to be driven together with the agitator, wherein the coupling device is configured, in a first direction of rotation of the actuator, only to drive the agitator, such that the first operating state is obtained, and, in a second, opposite direction of rotation of the actuator, to drive both the agitator and the auger conveyor, such that the second operating state is obtained; and wherein the auger conveyor comprises first and second spaced apart auger conveyors with said agitator being disposed between the first and second auger conveyors, and wherein said outlet is disposed directly beneath said agitator and wherein said first and second auger conveyors are configured to convey granular material past the agitator and to the outlet.

2. The agricultural implement according to claim 1, wherein the agitator is connected to a first drivable shaft, and wherein the auger conveyor comprises a screw blade which is arranged around a sleeve surrounding the shaft.

3. The agricultural implement according to claim 1, wherein the coupling device comprises a freehub.

4. The agricultural implement according to claim 1, wherein the auger conveyor comprises a first screw blade portion, which is located on a first axial side of the agitator, and a second screw blade portion, which is located on a second axial side of the agitator, wherein said first and second screw blade portions are threaded in opposite directions such that, when they rotate with a first direction of rotation, they feed the material axially towards the agitator.

5. The agricultural implement according to claim 4, wherein separate coupling devices are arranged for said first and second screw blade portions.

6. The agricultural implement according to claim 1, further comprising a trough, which forms said bottom.

7. The agricultural implement for feeding granular material to ground over which the agricultural implement travels, which agricultural implement has a container for the granular material, and a device according to claim 1, which is located at a lower portion of the container.

8. The agricultural implement according to claim 7, further comprising a material sensor and a control unit connected to the material sensor, wherein the control unit is designed to control the drive device based on a signal from the material sensor.

9. Method of feeding granular material to ground over which an agricultural implement travels, wherein the agricultural implement comprises an agitator, an auger conveyor, and a drive device which is arranged to drive the agitator and the auger conveyor, which method comprises adjusting the agricultural implement between:

a first operating state, in which the agitator is driven, but not the auger conveyor, and a second operating state, in which both the agitator and the auger conveyor are driven, wherein the adjustment is performed by changing a direction of rotation of a drive device, wherein the auger conveyor is activated with the aid of a coupling devices; and obtaining a higher speed of rotation in the second operating state than in the first operating state.

10. Method according to claim 9, wherein the agricultural implement comprises:

a container for the granular material, an outlet, arranged at a lower portion of the container, for the granular material, wherein the auger conveyor is arranged along the lower portion and is designed to feed material towards the outlet, and wherein the agitator is located at the outlet.

11. Method according to claim 9, which further comprises receiving a signal from a material sensor, and performing said adjustment based on a signal from the material sensor.

12. The agricultural implement of claim 1 wherein the drive device is configured to drive the agitator and auger conveyor at a higher speed in the second operating state than the speed at which the agitator is driven in the first operating state.

13. The agricultural implement of claim 1 wherein the agricultural implement includes a main frame, a container supported on the main frame, and a conveyor device disposed in the lower portion of the container device wherein the conveyor device comprises the auger conveyor and agitator.

14. An agricultural implement, comprising:

an auger conveyor which is designed to feed granular material, an agitator, and a drive device for driving the agitator and the auger conveyor, wherein the auger conveyor and the agitator of the agricultural implement are rotatable about a common geometric axis, an upwardly concave bottom along which the granular material is transportable with the aid of the auger conveyor, and an outlet in said bottom, wherein the agitator is located at the outlet; the drive device is adjustable between:

a first operating state, in which the agitator is driven, but not the auger conveyor, and a second operating state, in which both the agitator and the auger conveyor are driven, wherein the drive device comprises an actuator, which is configured to drive the agitator, and a coupling device, which is configured to cause the auger conveyor to be driven together with the agitator, wherein the coupling device is configured, in a first direction of rotation of the actuator, only to drive the agitator, such that the first operating state is obtained, and, in a second, opposite direction of rotation of the actuator, to drive both the agitator and the auger conveyor, such that the second operating state is obtained; and wherein the drive device is configured to drive the agitator and auger conveyor at a higher speed in the second operating state than the speed at which the agitator is driven in the first operating state.

* * * * *